(12) United States Patent
Kitanaka (10) Patent No.: US 8,531,150 B2
(45) Date of Patent: Sep. 10, 2013

(54) DCDC CONVERTER

(75) Inventor: Hidetoshi Kitanaka, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 338 days.

(21) Appl. No.: 13/055,161

(22) PCT Filed: Sep. 19, 2008

(86) PCT No.: PCT/JP2008/067025
§ 371 (c)(1),
(2), (4) Date: Jan. 21, 2011

(87) PCT Pub. No.: WO2010/032316
PCT Pub. Date: Mar. 25, 2010

(65) Prior Publication Data
US 2011/0121798 A1    May 26, 2011

(51) Int. Cl.
*H02P 23/00* (2006.01)
(52) U.S. Cl.
USPC ............ 318/807; 318/812; 323/222; 323/266
(58) Field of Classification Search
USPC ................. 323/222, 223, 224, 226, 282, 283, 323/284, 285, 286; 318/106, 109, 139, 807, 318/812, 801, 808; 307/45, 46, 10.1
See application file for complete search history.

(56) References Cited

U.S. PATENT DOCUMENTS

| | | | |
|---|---|---|---|
| 5,132,894 A | 7/1992 | Rozman et al. | |
| 7,071,660 B2 * | 7/2006 | Xu et al. | 323/266 |
| 7,615,887 B2 * | 11/2009 | Stancu et al. | 307/46 |
| 8,106,620 B2 * | 1/2012 | Kitanaka | 318/807 |
| 2006/0158127 A1 | 7/2006 | Xu | |
| 2007/0001653 A1 | 1/2007 | Xu | |
| 2007/0108953 A1 * | 5/2007 | Latham | 323/283 |
| 2008/0219032 A1 | 9/2008 | Stancu et al. | |

FOREIGN PATENT DOCUMENTS

| | | |
|---|---|---|
| CN | 1797917 A | 7/2006 |
| CN | 1842958 A | 10/2006 |
| JP | 4-229021 A | 8/1992 |
| JP | 10-336896 A | 12/1998 |
| JP | 2003-018702 A | 1/2003 |
| JP | 2007-274756 A | 10/2007 |
| RU | 2 182 743 C1 | 5/2002 |
| WO | 2008026249 A1 | 3/2008 |

OTHER PUBLICATIONS

Office Action (Decision on Grant) dated Jan. 27, 2012, issued in the corresponding Russian Patent Application No. 2011115239, and an English Translation thereof. (13 pages).

(Continued)

*Primary Examiner* — Nguyen Tran
(74) *Attorney, Agent, or Firm* — Buchanan Ingersoll & Rooney PC (57) ABSTRACT

A DCDC converter includes a switching circuit, to an input end of which an input filer circuit is connected, a smoothing filter circuit connected to an output end of the switching circuit and including a reactor and a capacitor, and a control unit that feeds back a state amount of the smoothing filter circuit and turns the switching circuit on and off. The control unit includes a damping control unit that calculates, based on the voltage of the capacitor, a damping operation amount for adjusting a state amount of the smoothing filter circuit.

19 Claims, 6 Drawing Sheets

(56) References Cited

OTHER PUBLICATIONS

International Search Report (PCT/ISA/210) issued on Dec. 16, 2008, by Japanese Patent Office as the International Searching Authority for International Application No. PCT/JP2008/067025.

Written Opinion (PCT/ISA/237) issued on Dec. 16, 2008, by Japanese Patent Office as the International Searching Authority for International Application No. PCT/JP2008/067025.

Office Action from Chinese Patent Office dated Feb. 17, 2013, issued in corresponding Chinese Patent Application No. 200880131167.4, with English translation thereof.

Office Action from Canadian Intellectual Property Office dated Mar. 26, 2013, issued in corresponding Canadian Patent Application No. 2,737,427.

\* cited by examiner

DCDC CONVERTER

TECHNICAL FIELD

The present invention relates to a DCDC converter suitable for application to, for example, an electric motor car.

BACKGROUND ART

In general, for the electric motor car, a configuration for collecting electric power from an overhead wire, a third rail, or the like with a current collector and driving a motor using the collected power is adopted.

In recent years, because the performance of power storage elements such as a secondary battery and an electric double layer capacitor is improved, development of a system is underway in which the power storage elements are mounted on an electric motor car, collected electric power is stored in the power storage elements, and a motor is driven by using both the electric power stored in the power storage elements and electric power collected by a current collector.

As such a system, for example, there is an electric motor car control apparatus disclosed in Patent Document 1 described below. In this electric motor car control apparatus, to control power flow between an overhead wire and a power storage element, a DCDC converter is provided between the current collector and the power storage element.

Although not provided in the electric motor car control apparatus disclosed in Patent Document 1, in the system of this type, a reactor is provided between the DCDC converter and the overhead wire and attenuation of a harmonic current output from the DCDC converter to the overhead wire side is performed by an LC filter circuit including this reactor and an input capacitor.

Patent Document: Japanese Patent Application Laid-open No. 2007-274756

DISCLOSURE OF INVENTION

Problem to be Solved by the Invention

However, the inventor found that, when the DCDC converter is actuated, because, for example, electric oscillation occurs in the LC filter circuit and the input capacitor is subjected to overvoltage, in some case, normal operation of the DCDC converter cannot be performed.

The present invention has been devised in view of the knowledge of the inventor and it is an object of the present invention to provide a DCDC converter that suppresses electric oscillation occurring in an LC filer circuit and enables stable operation.

Means for Solving Problem

In order to solve the aforementioned problems and attain the aforementioned object, a DCDC converter according to one aspect of the present invention is constructed in such a manner as to have an input filter circuit including an input reactor connected to a DC power supply and an input capacitor and converts a DC voltage of the input capacitor into an arbitrary DC voltage to output the DC voltage, and further includes: a switching circuit, to an input end of which the input filer circuit is connected, the switching circuit including an upper arm side switching element and a lower arm side switching element; a smoothing filer circuit connected to an output end of the switching circuit; and a control unit that feeds back a state amount of the smoothing filter circuit and controls to turn on and off the switching circuit, wherein the control unit includes a damping control unit that calculates, based on a voltage of the input capacitor, a damping operation amount for adjusting a state amount of the smoothing filter circuit.

Effect of the Invention

According to the present invention, the switching circuit is controlled based on an optimum damping operation amount for controlling electric oscillation occurring in the input filter circuit. Therefore, there is an effect that it is possible to suppress the electric oscillation occurring in the LC input filter circuit and perform stable operation of the DCDC converter.

EXPLANATIONS OF LETTERS OR NUMERALS

1 Overhead wire
2 Current collector
3 Wheel
4 Rail
5 Reactor
6 Capacitor
7 Voltage detector
8 Input filter circuit
10 Switching circuit
11 Upper arm side switching element
12 Lower arm side switching element
20 Smoothing reactor
21 Current detector
22 Smoothing capacitor
23 Voltage detector
24 Load
25 Current detector
26 Power storage element
27, 27a Smoothing filter circuits
30 Multiplier
31 Subtracter
32 Voltage controller
33 Adder
34 Multiplier
35 Subtracter
36 Current controller
37 Modulation circuit
40 Damping control unit
41 HPF (high-pass filter)

42, 43 LPFs (low-pass filters)
44 Adder
45 Divider
46 Subtracter
47 Switch
48 Square operator
49 Limiter
50, 50a Control-signal generating units
60 Resistor
70 DC power supply
80 Constant power load
100, 100a, 100b DCDC converters
200, 200a Main circuit units
300, 300a, 300b Control units

BEST MODE(S) FOR CARRYING OUT THE INVENTION

Embodiments of a DCDC converter according to the present invention are explained in detail below based on the drawings. The present invention is not limited by the embodiments explained below.

First Embodiment

Figure 1:
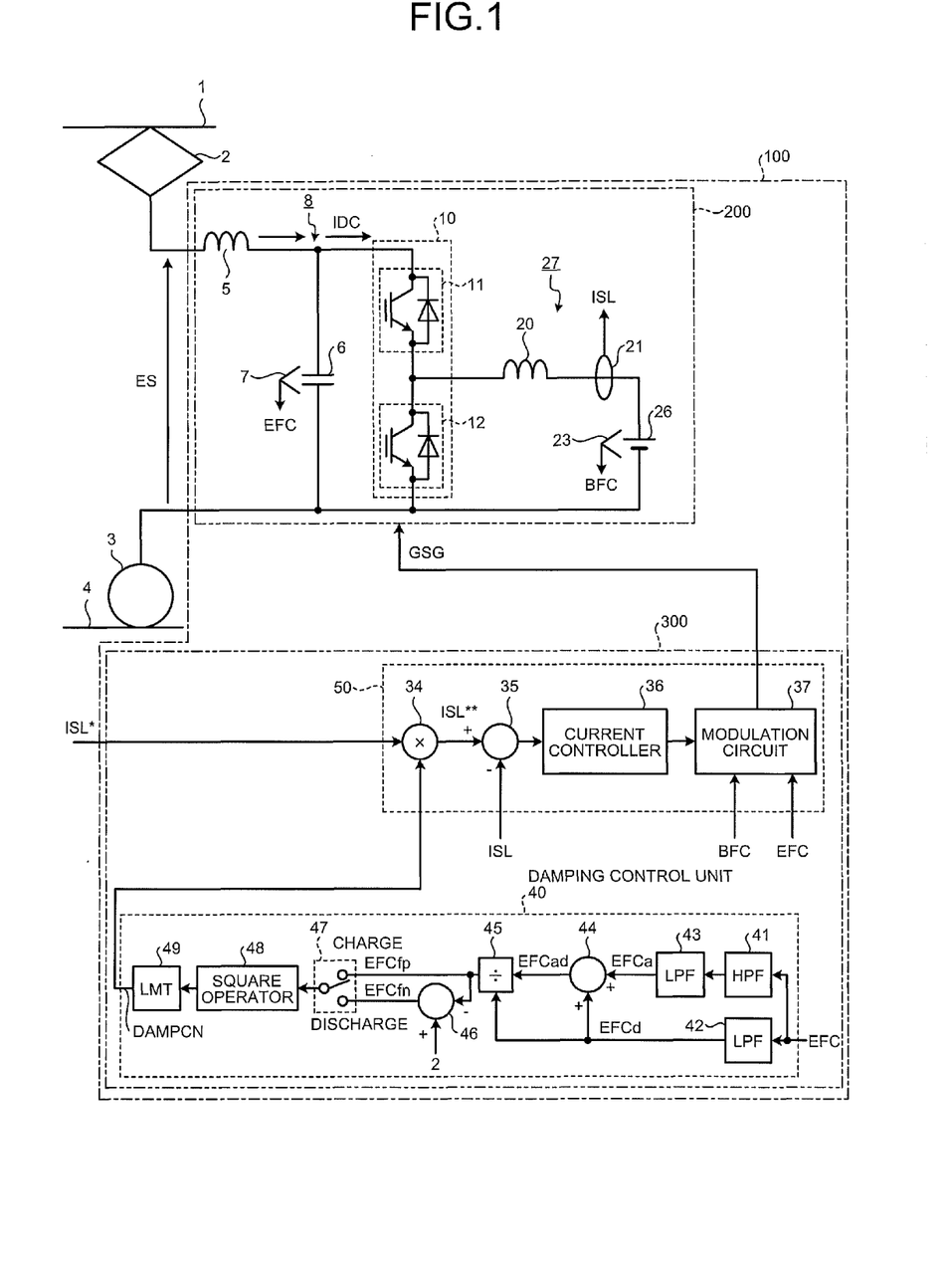
FIG. 1 is a diagram of a configuration example of a DCDC converter in a first embodiment.

FIG. 1 is a diagram of a configuration example of a DCDC converter in a first embodiment of the present invention. As shown in FIG. 1, a DCDC converter 100 is electrically connected to an overhead wire 1, which is connected to a substation (not shown) serving as a DC power supply, via a current collector 2. The DCDC converter 100 is also electrically connected to a rail 4, which is connected to the substation, via a wheel 3 serving as a return circuit for a return current.

The DCDC converter 100 includes a main circuit unit 200 and a control unit 300 that controls a power flow in the main circuit unit 200.

First, the configuration of the main circuit unit 200 is explained. In FIG. 1, the main, circuit unit 200 includes, as main components, an input filter circuit 8, a voltage detector 7, a switching circuit 10, a smoothing filter circuit 27, a voltage detector 23, a current detector 21, and a power storage element 26. The switching circuit 10 includes an upper arm side switching element 11 and a lower arm side switching element 12. The input filter circuit 8 includes a reactor 5 as an input reactor and a capacitor 6 as an input capacitor. The smoothing filter circuit 27 includes a smoothing reactor 20.

Schematic functions of the units included in the main circuit unit 200 are explained. The switching circuit 10 functions as a power converting circuit in two directions from the overhead wire 1 to the power storage element 26 and from the power storage element 26 to the overhead wire 1. The input filter circuit 8 suppresses a harmonic current generated from the switching circuit 10 from flowing out to the substation side via the current collector 2. The voltage detector 7 detects a voltage EFC at both ends of the capacitor 6. The power storage element 26 accumulates required electric power. The voltage detector 23 detects a terminal voltage BFC of the power storage element 26. The smoothing filter circuit 27 performs filtering of a current ripple generated from the switching circuit 10. The current detector 21 detects an electric current flowing to the smoothing reactor 20 (hereinafter referred to as "smoothing reactor current") ISL.

A connection configuration of the main circuit unit 200 is explained. An output side of the switching circuit 10 is connected to the power storage element 26 via the smoothing reactor 20 and the current detector 21 with a connection end between the upper arm side switching element 11 and the lower arm side switching element 12 (one end of the upper arm side switching element 11) used as an output end. An input side of the switching circuit 10 is connected to the overhead wire 1 via the input filter circuit 8 and the current collector 2 with the other end of the upper arm side switching element 11 used as an input end.

As the power storage element 26, a nickel hydrogen secondary battery, a lithium ion secondary battery, an electric double layer capacitor, or the like is suitable. However, other power storage elements can be used. As the DC power supply that supplies electric power to the overhead wire 1, the substation is explained as an example. However, the DC power supply can be other DC power supply.

The configuration and the function of the control unit 300 are explained. The control unit 300 includes a control-signal generating unit 50 and a damping control unit 40. The control-signal generating unit 50 includes a multiplier 34, a subtracter 35, a current controller 36, a modulation circuit 37, and a damping control unit 40.

The multiplier 34 performs multiplication of a smoothing reactor current command ISL* input from a host control system (not shown) and a damping operation amount DAMPCN explained later. The smoothing reactor current command ISL* is a command value of the smoothing reactor current ISL.

The subtracter 35 subtracts the smoothing reactor current ISL from an output (ISL**) of the multiplier 34.

The current controller 36 is input with an output of the subtracter 35 and performs proportional integral control. As a control system of the current controller 36, the proportional integral control is suitable. However, the control system can be proportional control. The current controller 36 can be configured by a publicly-known technology irrespective of which of the control systems is adopted. Therefore, explanation of the control system is omitted here.

The modulation circuit 37 outputs, based on an output of the current controller 36, the voltage EFC of the capacitor 6, and the terminal voltage BFC of the power storage element 26, a control signal to the switching circuit 10 (hereinafter referred to as "switching signal") GSG.

The damping control unit 40 is input with the voltage EFC of the capacitor 6 and outputs the damping operation amount DAMPCN. The configuration of the damping control unit 40 is explained later together with the operation thereof.

Power flow control of the main circuit unit 200 by the control unit 300 configured as above is explained.

The smoothing reactor current command ISL* is the command value of the smoothing reactor current ISL output from the host control system (not shown) as explained above. When charge and discharge of the power storage element 26 are unnecessary, ISL* is set to 0 and the control unit 300 controls the switching circuit 10 of the main circuit unit 200 such that the smoothing reactor current ISL does not flow.

When charge of the power storage element 26 is necessary, ISL* is set to a positive value and the control unit 300 controls the switching circuit 10 of the main circuit unit 200 to perform a charge operation such that the smoothing reactor current ISL changes to a power flow from the overhead wire 1 side to the power storage element 26 side.

When discharge of the power storage element 26 is necessary, ISL* is set to a negative value and the control unit 300 controls the switching circuit 10 of the main circuit unit 200 to perform a discharge operation such that the smoothing reactor current ISL changes to a power flow from the power storage element 26 side to the overhead wire 1 side.

In short, the DCDC converter 100 functions as a control current source that controls, according to the smoothing reactor current command ISL* output from the host control system, the smoothing reactor current ISL to be a predetermined value and is capable of realizing an arbitrary power flow corresponding to necessity.

The damping control unit 40 as a main part of this embodiment is explained.

Before specific explanation of the damping control unit 40 shown in FIG. 1, a cause of occurrence of electric oscillation in an LC filter including the input filter circuit 8 (the reactor 5 and the capacitor 6) of the main circuit unit 200 shown in FIG. 1 and a principle of suppression of electric oscillation as a ground for the configuration of the damping control unit 40 are briefly explained with reference to drawings of FIGS. 1 to 5.

Figure 2:
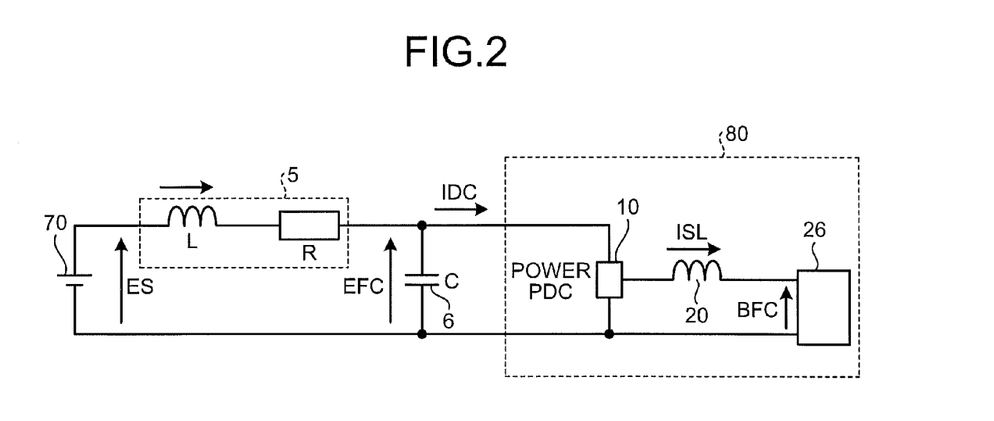
FIG. 2 is a circuit block diagram in which a main circuit unit shown in FIG. 1 is simplified.

First, the cause of occurrence of electric oscillation in the LC filter of the main circuit unit 200 shown in FIG. 1 is explained. FIG. 2 is a circuit block diagram in which the main circuit unit 200 shown in FIG. 1 is simplified. In FIG. 2, the overhead wire 1, the current collector 2, the wheel 3, and the rail 4 in FIG. 1 are not shown and the substation is replaced with a DC power supply 70. The reactor 5 includes an inductance component L and a resistance component R. The capacitance of the capacitor 6 is represented as C.

The switching circuit 10 is controlled such that the smoothing reactor current ISL is maintained constant even if the voltage EFC of the capacitor 6 fluctuates. In other words, even if the voltage EFC of the capacitor 6 fluctuates, because input power PDC of the switching circuit 10 is controlled not to change, the switching circuit 10 has a constant power characteristic with respect to the fluctuation in the voltage EFC of the capacitor 6. Therefore, blocks including the switching circuit 10, the smoothing reactor 20, and the power storage element 26 are collected as one load viewed from the LC filer side and set as a constant power load 80.

In FIG. 2, the constant power load 80 has a negative resistance characteristic that, if the voltage EFC of the capacitor 6 rises, an input current IDC of the switching circuit 10 decreases and, if the voltage EFC of the capacitor 6 falls, the input current IDC of the switching circuit 10 increases. A normal resistor (a positive resistor) has a positive resistance characteristic that, if a voltage rises, an electric current increases and, if the voltage falls, the electric current decreases. In other words, the constant power load 80 has a characteristic opposite to that of the normal resistor in a change of an electric current with respect to a change in a voltage.

Therefore, if the voltage EFC of the capacitor 6 rises and the input current IDC of the switching circuit 10 decreases, the circuit shown in FIG. 2 operates to facilitate the rise in the voltage EFC of the capacitor 6. Conversely, if the voltage EFC of the capacitor 6 falls and the input current IDC of the switching circuit 10 increases, the circuit operates to facilitate the fall in the voltage EFC of the capacitor 6. Therefore, in the circuit shown in FIG. 2, damping is not effective on the fluctuation in the voltage EFC of the capacitor 6, electric oscillation of the voltage EFC of the capacitor 6 occurs at a resonant frequency of the LC filter, the amplitude of the occurred electric oscillation expands, and the voltage EFC continues to oscillate. The above is qualitative explanation of the cause of occurrence of the electric oscillation in the LC filters of the main circuit unit 200 shown in FIG. 1 and the circuit shown in FIG. 2.

A transfer function of the circuit shown in FIG. 2 is calculated and evaluated and quantitative explanation of the phenomenon qualitatively explained above is made.

First, a relational expression of the input power PDC of the switching circuit 10, the input current IDC of the switching circuit 10, and the voltage EFC of the capacitor 6 is the following Formula (1):

$$EFC \times IDC = PDC (=\text{constant}) \tag{1}$$

Because Formula (1) is nonlinear, Formula (1) is linearized. When a voltage and an electric current at an operating point are respectively represented as EFC0 and IDC0, the following Formula (2) holds near the operating point:

$$IDC = -\frac{PDC(EFC - EFC0)}{EFC0^2} + IDC0 \tag{2}$$

Figure 3:
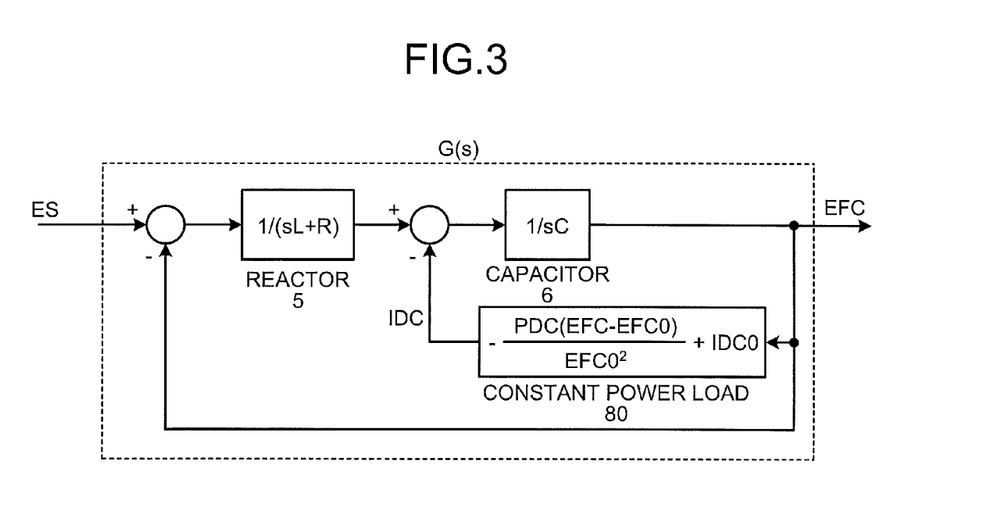
FIG. 3 is a block diagram of a transfer function of a circuit shown in FIG. 2.

Therefore, the circuit shown in FIG. 2 is represented by a block diagram shown in FIG. 3. FIG. 3 is a block diagram of a transfer function of the circuit shown in FIG. 2. In the transfer function block diagram shown in FIG. 3, a closed loop transfer function G(s) from an input voltage ES to the voltage EFC of the capacitor 6 is represented by the following Formula (3):

$$G(s) = \frac{\frac{1}{C \cdot L}}{s^2 + \left(\frac{R}{L} - \frac{PDC}{C \cdot EFC0^2}\right) \cdot s - \frac{1}{C \cdot L}\left(\frac{R \cdot PDC}{EFC0^2} - 1\right)} \tag{3}$$

A condition for stabilizing a closed loop system shown in the closed loop transfer function G(s) of Formula (3) is that all poles of G(s) are negative. In other words, all solutions of a characteristic equation indicated by the following Formula (4), which is the denominator of G(s), need to be negative.

$$s^2 + \left(\frac{R}{L} - \frac{PDC}{C \cdot EFC0^2}\right) \cdot s - \frac{1}{C \cdot L}\left(\frac{R \cdot PDC}{EFC0^2} - 1\right) = 0 \tag{4}$$

When solutions of Formula (4) are represented as $\alpha$ and $\beta$, conditional expressions for making both $\alpha$ and $\beta$ negative are the following Formulas (5) and (6) from a relation between the solutions and coefficients:

$$\alpha + \beta = -\left(\frac{R}{L} - \frac{PDC}{C \cdot EFC0^2}\right) < 0 \tag{5}$$

$$\alpha \cdot \beta = -\frac{1}{C \cdot L}\left(\frac{R \cdot PDC}{EFC0^2} - 1\right) > 0 \tag{6}$$

A conditional expression of the resistance component R of the reactor 5 for stabilizing the closed loop system indicated by the transfer function G(s) of Formula (3) is calculated. Attention is directed to Formula (5) because Formula (6) does not include useful information. When Formula (5) is modified, the following Formula (7) as the conditional expression of the resistance component R of the reactor 5 is obtained.

$$R > \frac{L}{C} \cdot \frac{PDC}{EFC0^2} \tag{7}$$

According to Formula (7), R necessary for stabilizing the system can be smaller as L is smaller, C is larger, PDC is smaller, and EFC0 is larger. As an example, when conditions L=12 mH, C=6600 μF, PDC=1000 KW, and EFC0=1500 V, which are general numerical values, are substituted in Formula (7), a value of the resistance component R of the reactor 5 that can stabilize the closed loop system indicated by the transfer function G(s) of Formula (3) is R>0.8 (Ω).

In general, a resistance component included in a reactor is very small at about several tens (mΩ) and it is impossible to satisfy Formula (7). Therefore, the closed loop system of the circuit shown in FIG. 2 is unstable and electric oscillation occurs at a resonant frequency of the LC filter. In other words, it can be understood that, unless a resistor that satisfies Formula (7) is added to the circuit shown in FIG. 2 or stabilization of the closed loop system is realized in terms of control, the voltage EFC of the capacitor 6 oscillates and diverges. Actually, the addition of the resistor increases the size of an apparatus and causes an increase in a loss. Therefore, another method of realizing the stabilization in terms of control is necessary.

The above is the quantitative explanation of the cause of occurrence of the electric oscillation at the resonant frequency of the LC filters of the main circuit unit 200 shown in FIG. 1 and of the circuit shown in FIG. 2.

The principle of suppression of electric oscillation as a technical ground for the configuration of the damping control unit 40 according to this embodiment is explained.

As explained above, the constant power load 80 of the circuit shown in FIG. 2 has the negative resistance characteristic. If this constant power load has a positive resistance characteristic, it is possible to stabilize the closed loop. Therefore, quantitative explanation same as above is made using a circuit diagram in which the constant power load 80 of the circuit shown in FIG. 2 is replaced with a resistor.

Figure 4:
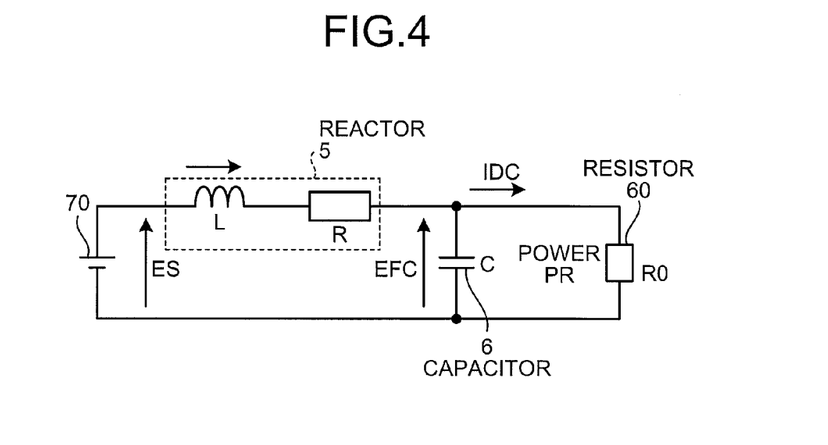
FIG. 4 is a circuit block diagram in which a constant power load of the circuit shown in FIG. 2 is replaced with a resistor.

FIG. 4 is a circuit block diagram in which the constant power load 80 of the circuit shown in FIG. 2 is replaced with a resistor 60. As shown in FIG. 4, as a load viewed from the LC filter side, the resistor 60 having a resistance value R0 is connected in FIG. 4.

Figure 5:
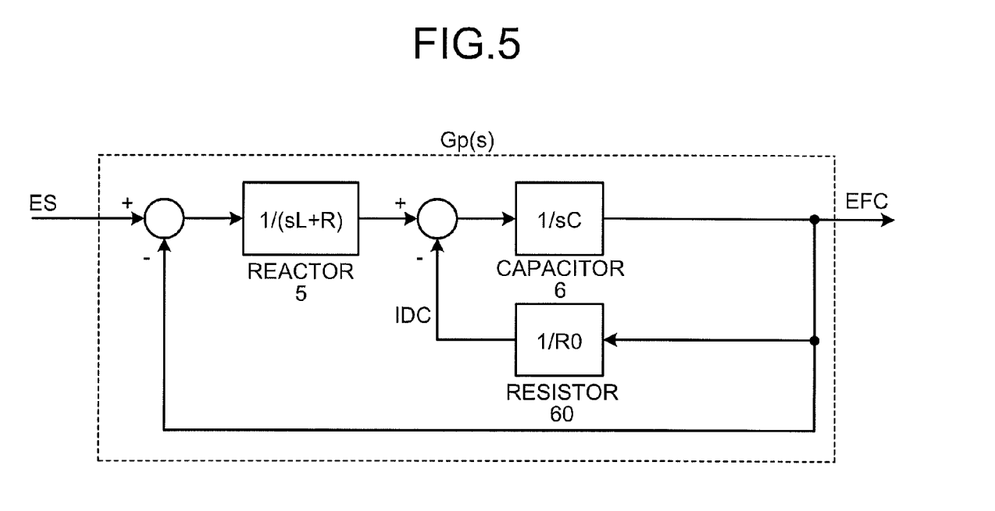
FIG. 5 is a block diagram of a transfer function of a circuit shown in FIG. 4.

FIG. 5 is a block diagram of a transfer function of the circuit shown in FIG. 4. According to the transfer function block diagram shown in FIG. 5, the closed loop transfer function Gp(s) from the input voltage ES to the voltage EFC of the capacitor is represented by the following Formula (8):

$$Gp(s) = \frac{\frac{1}{L \cdot C}}{s^2 + \left(\frac{1}{C \cdot R0} + \frac{R}{L}\right) \cdot s + \frac{1}{C \cdot L} \cdot \left(\frac{R}{R0} + 1\right)} \quad (8)$$

A characteristic equation of the closed loop transfer function Gp(s) indicated by Expression (8) is the following Formula (9):

$$s^2 + \left(\frac{1}{C \cdot R0} + \frac{R}{L}\right) \cdot s + \frac{1}{C \cdot L} \cdot \left(\frac{R}{R0} + 1\right) = 0 \quad (9)$$

When a condition for making all solutions of the characteristic equation indicated by Formula (9) negative is calculated, a value of the resistance component R of the reactor 5 is R≧0 and this condition is always satisfied. In other words, it is seen that, as shown in FIG. 4, when the load viewed from the LC filer side includes the resistor 60, the closed loop system is always stable.

As explained above, it is seen that the circuit in which the resistor 60 is connected to the LC filter connected to the DC power supply 70 is always stable. The control circuit explained in this embodiment is devised with attention directed to this principle. Specifically, the control circuit controls the switching circuit 10 such that the constant power load 80 of the circuit shown in FIG. 2 has a characteristic equivalent to the positive resistance characteristic with respect to an oscillation component of the voltage EFC of the capacitor 6.

Subsequently, a control condition for the constant power load 80 of the circuit shown in FIG. 2 to have the characteristic equivalent to the positive resistance characteristic with respect to electric oscillation of the voltage EFC of the capacitor 6 occurring at the resonant frequency of the LC filter is derived.

In FIG. 4, when the voltage of the capacitor 6 is EFC and the electric current flowing to the resistor 60 is IDC, electric power PR in the resistor 60 is represented by the following Formula (10):

$$PR = EFC \cdot IDC \quad (10)$$

When the voltage EFC of the capacitor 6 fluctuates and increases to n times an initial voltage, the electric current IDC flowing to the resistor 60 also increases to n times an initial electric current. Therefore, electric power PRn in the resistor 60 at this point is represented by the following Formula (11):

$$PRn = n \cdot EFC \cdot n \cdot IDC = n^2 \cdot EFC \cdot IDC = n^2 \cdot PR \quad (11)$$

In other words, the electric power PRn in the resistor 60 is proportional to the square of a change rate of the voltage EFC of the capacitor 6. Therefore, the constant power load 80 is controlled such that the relation of Formula (11) holds. This makes it possible to cause the constant power load 80 to operate to have the positive resistance characteristic with respect to the fluctuation in the voltage EFC of the capacitor 6.

On the other hand, in FIG. 2, when a circuit loss of the switching circuit 10 is neglected, the output power of the switching circuit 10 is equal to the input power PDC of the switching circuit 10. Therefore, the following Formula (12) holds from the smoothing reactor current ISL flowing in the power storage element 26 and the terminal voltage BFC of the power storage element 26:

$$PDC = ISL \cdot BFC \quad (12)$$

The terminal voltage BFC of the power storage element 26 is a value that changes according to stored energy of the power storage element 26.

To cause the constant power load 80 to operate to have the positive resistance characteristic with respect to the fluctuation in the voltage EFC of the capacitor 6, electric power PDCn at the time when the voltage EFC of the capacitor 6 increases to n times has only to satisfy a relation of the following Formula (13) in the same manner as the electric power PRn satisfying Formula (11):

$$PDCn = n^2 \cdot PDC = n^2 \cdot ISL \cdot BFC \quad (13)$$

The resonant frequency of the LC filter is usually 10 hertz to 20 hertz, which is equivalent to time of 50 milliseconds to 100 milliseconds in terms of a period. On the other hand, the terminal voltage BFC of the power storage element 26 can be regarded as fixed in time unit of several tens seconds. In other words, in considering electric oscillation at the resonant frequency of the LC filter, it can be assumed that the terminal voltage BFC of the power storage element 26 is fixed.

Therefore, when the voltage EFC of the capacitor 6 increases to n times, if the switching circuit 10 is controlled to multiply the smoothing reactor current ISL by $n^2$, the input power PDC of the switching circuit 10 can be changed in proportion to the square of the change rate of the voltage EFC of the capacitor 6. The constant power load 80 of the circuit shown in FIG. 2 has a characteristic equivalent to the positive resistance characteristic with respect to the electric oscillation of the voltage EFC of the capacitor 6 occurring at the resonant frequency of the LC filter.

Therefore, in the control unit 300 shown in FIG. 1, a value obtained by raising a fluctuation rate of the voltage EFC of the capacitor 6 to the second power is integrated with the smoothing reactor current command ISL*. This makes it possible to suppress the electric oscillation of the voltage EFC of the capacitor 6 occurring at the resonant frequency of the LC filter and stabilize the voltage EFC.

Figure 6:
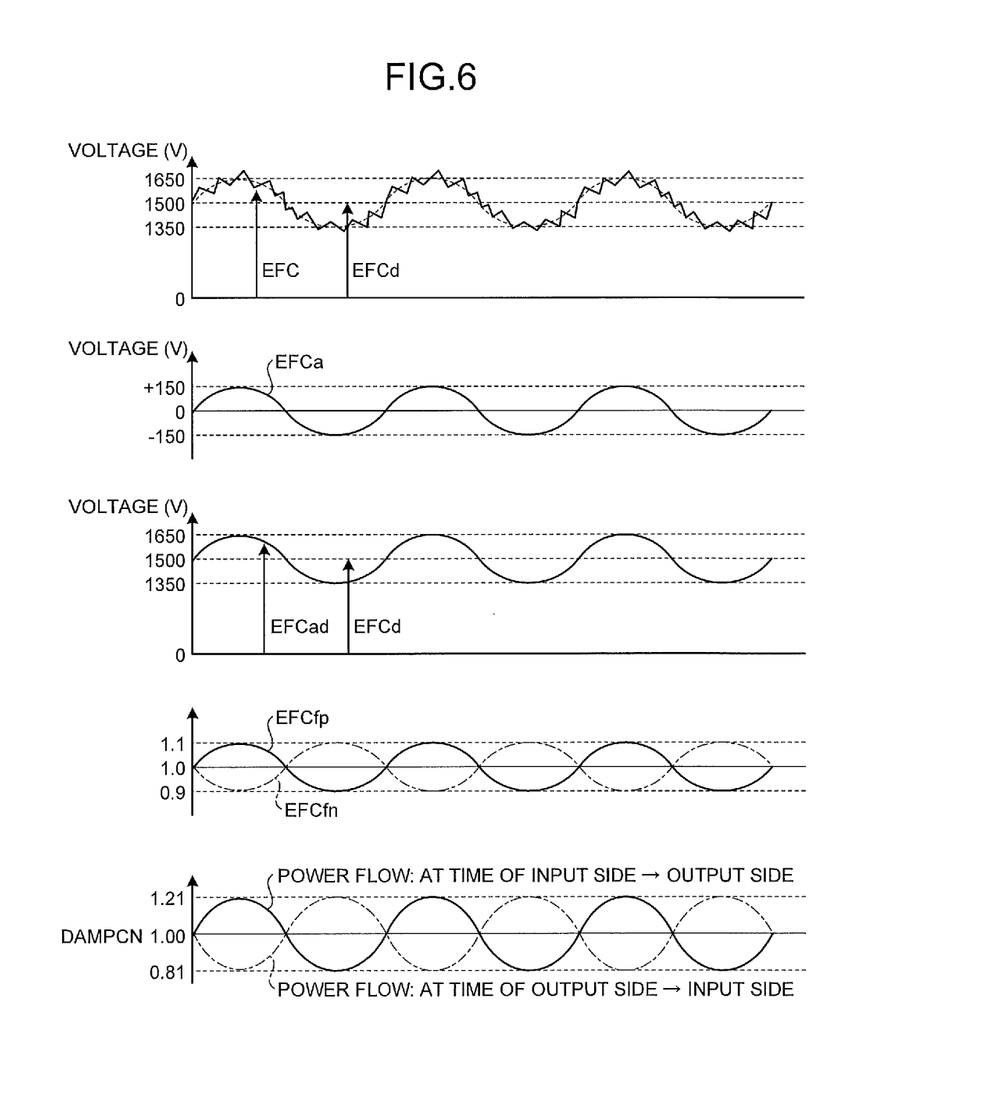
FIG. 6 is a diagram of changes in state amounts on the inside of a damping control unit and signal waveforms in the first embodiment.

A specific configuration for embodying the control method explained above is explained with reference to FIGS. 1 and 6. FIG. 6 is a diagram of changes in state amounts on the inside of the damping control unit 40 and signal waveforms in the first embodiment.

First, the configuration of the damping control unit 40 is explained with reference to FIG. 1. The damping control unit 40 includes a high-pass filter (hereinafter referred to as "HPF") 41, low-pass filters (hereinafter referred to as "LPFs") 42 and 43, an adder 44, a divider 45, a subtracter 46, a switch 47, a square operator 48, and a limiter 49.

The voltage EFC of the capacitor 6 is input to the damping control unit 40 and is divided into two systems.

The HPF 41 and the LPF 43 are connected to one system in series A resonant frequency component EFCa obtained by removing, with the HPF 41 and the LPF 43, an unnecessary low-frequency component and an unnecessary high-frequency component including a DC component of the voltage EFC of the capacitor 6 and extracting only a frequency component near the resonant frequency of the LC filter is output. For example, as shown in FIG. 6, when the voltage EFC of the capacitor 6 oscillates up to 1650 volts to 1350 volts with 1500 volts in the center, EFCa is a signal that fluctuates in-phase with a resonant frequency component of EFC in a range of +150 volts to −150 volts.

The LPF 42 is connected to the other system. A DC component EFCd obtained by extracting only a DC component of the voltage EFC of the capacitor 6 with the LPF 42 is output.

The HPF 41, the LPF 42, and the LPF 43 are first order filters including first order lag elements. Explanation of the configuration of the HPF 41, the LPF 42, and the LPF 43 is omitted because the configuration is publicly known. It goes without saying that the HPF 41, the LPF 42, and the LPF 43 can include second or higher order filters. However, there is a disadvantage that the configuration of the filters becomes complicated.

Actions of the HPF 41 and the LPF 43 are explained more in detail.

The LPF 43 is necessary to remove a high-frequency component, which is disturbance to the control system, included in the voltage EFC of the capacitor. However, a lower limit of the high-frequency component desired to be removed is several hundreds hertz and close to a resonant frequency band (usually, about 10 hertz to 20 hertz) of the LC filter, which is a target of damping control. Therefore, it is undesirable to remove the high-frequency component using only the LPF 43 because a phase delay of a resonant frequency component of the LC filter is caused. Therefore, the HPF 41 is added in series and combined with the LPF 43 to compensate for a phase delay of a resonant frequency band of the LC filter while securing a high-frequency component removal characteristic same as that obtained when the LPF 43 is independently used. Concerning characteristics of the HPF 41 and the LPF 43, it is desirable to adjust a frequency with a gain of 1 to the resonant frequency (10 hertz to 20 hertz) of the LC filter.

The adder 44 adds the DC component EFCd to the oscillation component EFCa of the resonant frequency band of the LC filter calculated as explained above and outputs EFCad.

The divider 45 divides EFCad by the DC component EFCd to thereby calculate a fluctuation rate of the oscillation component of the resonant frequency band of the LC filter included in the voltage EFC of the capacitor 6 (hereinafter simply referred to as "fluctuation rate") EFCfp.

The fluctuation rate EFCfp is divided into two systems. One system is directly output to the switch 47 and the other system is output to the subtracter 46. The subtracter 46 subtracts the fluctuation rate EFCfp from a predetermined value (in the example of this embodiment, a value "2") and outputs EFCfn obtained by inverting a phase of an oscillation component of the fluctuation rate EFCfp to the switch 47.

When a power flow is in a direction from the overhead wire 1 side to the power storage element 26 side, a contact on an upper side (a charge side) of the switch 47 is selected and the fluctuation rate EFCfp is input to the square operator 48.

On the other hand, when the power flow is in a direction from the power storage element 26 side to the overhead wire 1 side, a contact on a lower side (a discharge side) of the switch 47 is selected and the fluctuation rate EFCfn is input to the square operator 48.

When the power flow is in the direction from the power storage element 26 to the overhead wire 1 (the output side to the input side), EFCfn is used because the direction of the power flow is opposite to the direction from the overhead wire 1 to the power storage element 26 (the input side to the output side). In this case, operation in a direction for reducing the magnitude of electric power if the voltage EFC of the capacitor 6 increases and increasing the magnitude of electric power if the voltage EFC of the capacitor 6 decreases is necessary. Therefore, EFCfn obtained by inverting the phase of EFCfp is necessary.

The square operator 48 raises EFCfp or EFCfn to the second power and outputs EFCfp or EFCfn to the limiter 49. The limiter 49 outputs, after limiting an upper limit and a lower limit of a signal output from the square operator 48 to arbitrary values according to necessity, the signal to the multiplier 34 as the damping operation amount DAMPCN. In other words, when it is desired to limit a transient fluctuation amount of the smoothing reactor current ISL involved in, for example, damping control, the limiter 49 has only to set an upper limit and a lower limit for amplitude limitation.

Finally, the multiplier 34 integrates the damping operation amount DAMPCN with the smoothing reactor current command ISL* and generates a smoothing reactor current command ISL**.

Smoothing reactor current control is carried out according to the smoothing reactor current command ISL** obtained as explained above. This makes it possible to suppress oscillation of the voltage EFC of the capacitor 6 and perform stable operation of the DCDC converter 100.

As explained above, the DCDC converter according to the first embodiment includes the damping control unit that automatically calculates, without gain adjustment and the like, an optimum damping operation amount for suppressing electric oscillation occurring in the input filter circuit. The DCDC converter controls the switching circuit based on the obtained damping operation amount. This makes it possible to suppress electric oscillation occurring in the LC input filter circuit and perform stable operation of the DCDC converter functioning as a control current source.

The DCDC converter generates a smoothing reactor current command including the damping operation amount and controls the switching circuit based on the obtained smoothing reactor current command. Therefore, an electric current flowing to the smoothing reactor is optimally controlled to suppress electric oscillation of the input filter circuit and it is possible to perform stable operation.

In the configuration of the damping control unit, a fluctuation rate of the voltage of the input capacitor is calculated by dividing the voltage of the input capacitor by a DC component of the input capacitor. This makes it possible to perform control corresponding to the fluctuation rate of the voltage of the input capacitor.

In the configuration of the damping control unit, bands equal to or higher than a frequency near the resonant frequency of the LC filter are allowed to pass by the high-pass filter and bands equal to or lower than the frequency near the resonant frequency of the LC filter are allowed to pass by the low-pass filter. This makes it possible to cut an unnecessary high-frequency component, which is disturbance to the control system, without causing a phase delay near the resonant frequency of the LC filter.

In the configuration of the damping control unit, a fluctuation rate of the voltage of the input capacitor is raised to the second power to calculate a damping operation amount. This makes it possible to perform control of a smoothing reactor current matching the level of electric oscillation of the voltage of the input capacitor.

In the configuration of the damping control unit, an upper limit and a lower limit of a damping operation amount are limited at the final stage. This makes it possible to limit a transient fluctuation amount of a smoothing reactor current involved in, for example, the damping control.

Further, a constant of a circuit element of the DCDC converter is not used for calculation of the damping operation amount DAMPCN. Therefore, there is also an advantage that, even when the constant of the circuit element is changed, adjustment of the control system is unnecessary.

Second Embodiment

In the first embodiment, in the DCDC converter configured to function as the control current source that controls the smoothing reactor current ISL flowing in the power storage element to be a predetermined value, the control system that suppresses electric oscillation occurring at the resonant frequency of the LC filter and enables stable operation is configured. However, in a second embodiment, in a DCDC converter configured to replace the power storage element with a load and operate as a control voltage source that controls the voltage of the load to be a predetermined value, a control system that suppresses electric oscillation occurring at the resonant frequency of the LC filter and enables stable operation is configured.

Figure 7:
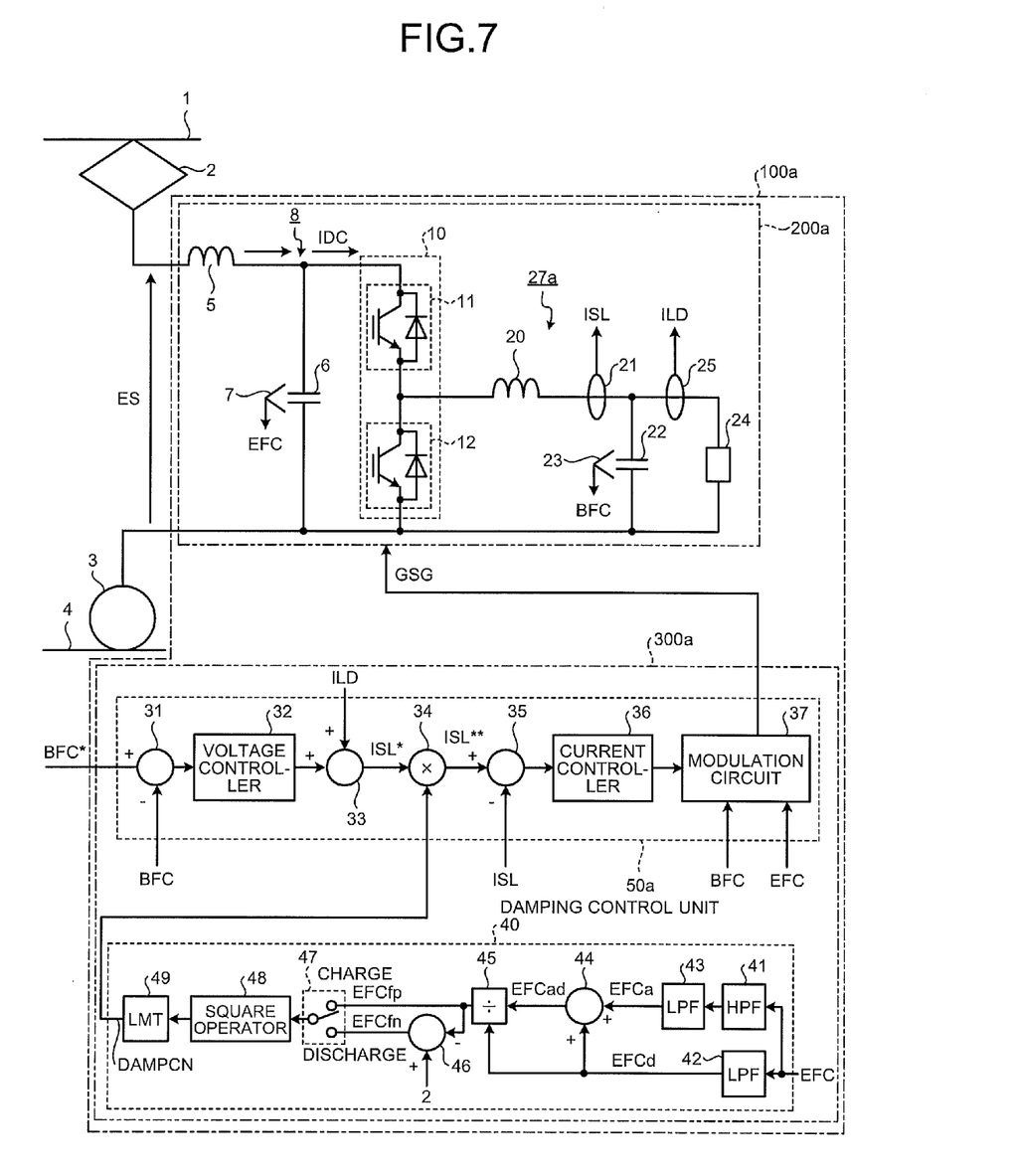
FIG. 7 is a diagram of a configuration example of a DCDC converter in a second embodiment.

FIG. 7 is a diagram of a configuration example of the DCDC converter in the second embodiment of the present invention. As shown in FIG. 7, a DCDC converter 100a in the second embodiment includes a main circuit unit 200a and a control unit 300a that controls a power flow in the main circuit unit 200a. Components same as or equivalent to those in the first embodiment are denoted by the same reference numerals and signs and detailed explanation of the components is omitted.

In the main circuit unit 200a, the power storage element 26 in the first embodiment is replaced with a load 24 and a smoothing capacitor 22 combined with the smoothing reactor 20 to configure a smoothing filter circuit 27a and a current detector 25 that detects an electric current flowing to the load 24 are provided at a post stage of the current detector 21 on the load 24 side of the switching circuit 10. The voltage of the load 24 is smoothed by a smoothing filter including the smoothing reactor 20 and the smoothing capacitor 22.

A control-signal generating unit 50a includes, in addition to the components in the first embodiment, a subtracter 31, a voltage controller 32, and an adder 33 at a pre-stage of the multiplier 34.

A smoothing capacitor voltage command BFC* as a command value of the voltage of the smoothing capacitor 22 is input to the control-signal generating unit 50a from a host control system (not shown). In other words, the DCDC converter 100a in the second embodiment operates as a control voltage source that controls the voltage of the load 24 to be a predetermined value according to the smoothing capacitor voltage command BFC* output from the host control system.

The subtracter 31 subtracts a voltage BFC of the smoothing capacitor 22 from BFC* and outputs the BFC*. The voltage controller 32 is input with the output of the subtracter 31 and performs proportional integral control. As a control system of the voltage controller 32, the proportional integral control or proportional control is suitable. Because the voltage controller 32 can be configured by a publicly-known technology irrespective of which of the control systems is adopted, explanation of the control system is omitted here.

The adder 33 adds up an output of the voltage controller 32 and a load current ILD and outputs the added-up output and the load current ILD to the multiplier 34 as the smoothing reactor current command ISL*.

The multiplier 34 integrates the damping operation amount DAMPCN with the smoothing reactor current command ISL* output from the adder 33 and generates the smoothing reactor current command ISL**.

Smoothing reactor current control is carried out according to the smoothing reactor current command ISL** obtained as explained above. Consequently, oscillation of the voltage EFC of the capacitor 6 is suppressed and it is possible to perform stable operation of the DCDC converter 100a.

Figure 8:
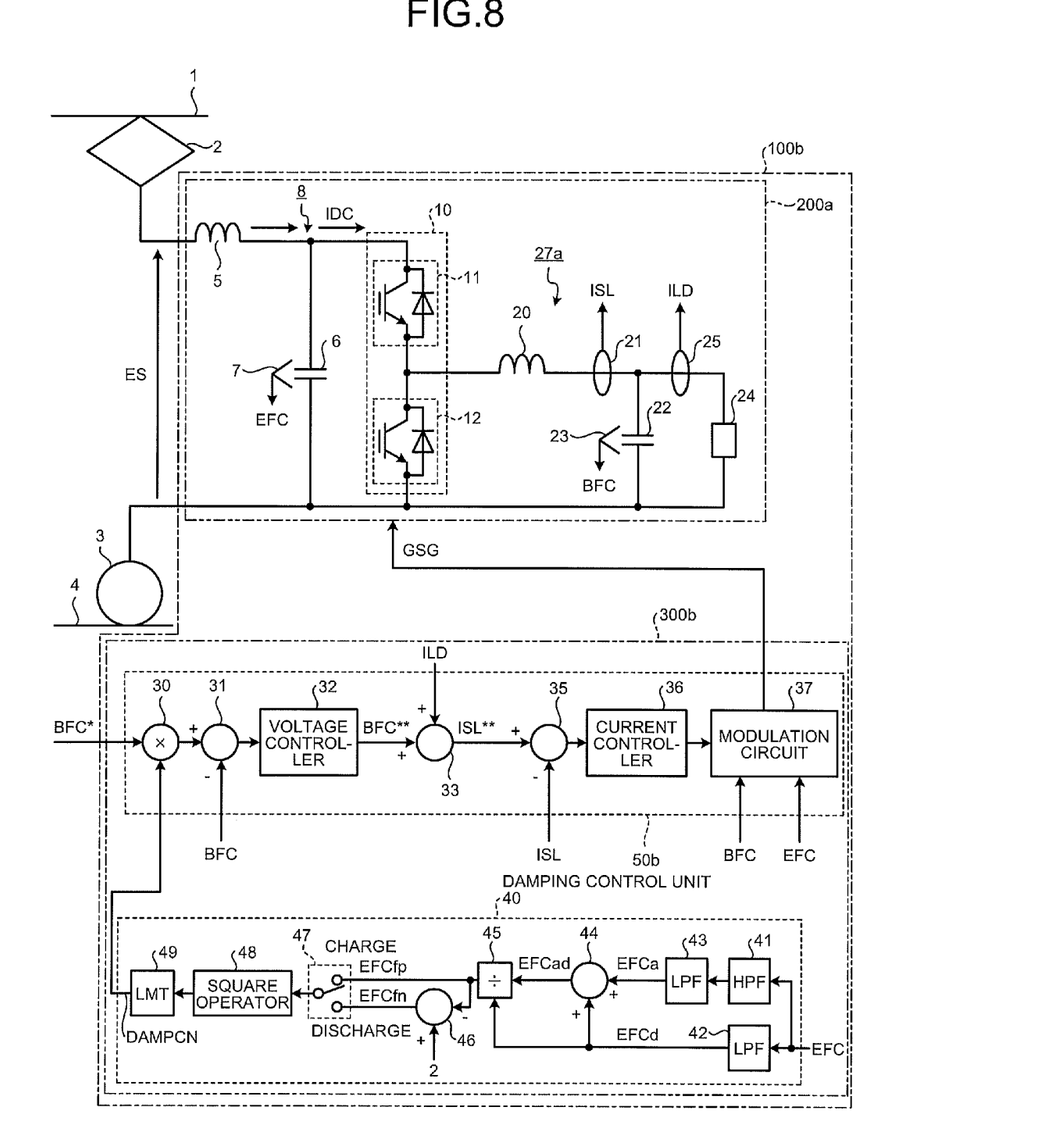
FIG. 8 is a diagram of another configuration example of the DCDC converter in the second embodiment.

Even when the DCDC converter is configured as shown in FIG. 8, it is possible to perform control same as that performed by the configuration shown in FIG. 7. FIG. 8 is a diagram of another configuration example of the DCDC converter in the second embodiment of the present invention.

As shown in FIG. 8, the configuration of the main circuit unit 200a in a DCDC converter 100b is the same as that shown in FIG. 7. A control-signal generating unit 50b of a control unit 300b is added with a multiplier 30 at a pre-stage of the subtracter 31 instead of the multiplier 34 at the post stage of the adder 33 shown in FIG. 7 and configured to multiply together a command value BFC* of the voltage of the smoothing capacitor 22 and the damping operation amount DAMPCN, generate a smoothing capacitor voltage command BFC, and add the smoothing capacitor voltage command BFC to the load current ILD with the adder 33 to thereby generate the smoothing reactor current command ISL**. Components other than those explained above are the same as the components shown in FIG. 7. As in FIG. 7, there is an effect that oscillation of the voltage EFC of the capacitor 6 is suppressed and it is possible to perform stable operation of the DCDC converter 100b.

In the configurations shown in FIGS. 7 and 8, the smoothing reactor current command ISL** is generated by using the load current ILD flowing to the load 24. This makes it possible to also suppress fluctuation in the voltage BFC of the smoothing capacitor 22.

As explained above, the DCDC converter according to the second embodiment includes the damping control unit that automatically calculates, without gain adjustment and the like, an optimum damping operation amount for suppressing electric oscillation occurring in the input filter circuit. The DCDC converter generates a smoothing reactor current command including the damping operation amount and controls the switching circuit based on the obtained smoothing reactor current command. This makes it possible to suppress electric oscillation occurring in the LC input filter circuit and perform stable operation of the DCDC converter functioning as the control voltage source.

A constant of a circuit element of the DCDC converter is not used for calculation of the damping operation amount DAMPCN. Therefore, there is an advantage that, even when the constant of the circuit element is changed, adjustment of the control system is unnecessary.

The configurations explained in the first and second embodiments are examples of the configuration of the present invention. It goes without saying that the configurations can be combined with another publicly-known technology or can be changed in such a manner, for example, that a part of the configurations is omitted without departing from the spirit of the present invention.

Further, in the embodiments, the explanation of the invention content is carried out with the DCDC converter assumed to be applied to the electric railroad field set as a target. However, an application field is not limited to this. It goes without saying that the DCDC converter can be applied to various industrial application fields.

INDUSTRIAL APPLICABILITY

As explained above, the DCDC converter according to the present invention is used as an invention that suppresses electric oscillation occurring in an input filter circuit and enables stable operation.

The invention claimed is:

1. A DCDC converter that has an input filter circuit including an input reactor connected to a DC power supply and an input capacitor and converts a DC voltage of the input capacitor into an arbitrary DC voltage to output the DC voltage, the DCDC converter comprising:
   a switching circuit with an input end connected to the input filter circuit, the switching circuit including an upper arm side switching element and a lower arm side switching element;
   a smoothing filter circuit connected to an output end of the switching circuit; and
   a control unit that feeds back a state amount of the smoothing filter circuit and controls to turn on and off the switching circuit, wherein
   the control unit includes a damping control unit that calculates, based on a voltage of the input capacitor, a damping operation amount for adjusting the state amount of the smoothing filter circuit by dividing the voltage of the input capacitor by a DC component of the voltage of the input capacitor to thereby calculate a fluctuation rate of the voltage of the input capacitor, wherein the damping operation amount corresponds to the fluctuation rate.

2. The DCDC converter according to claim 1, wherein, when the DCDC converter has a smoothing reactor, one end of which is connected to the output end of the switching circuit, as the smoothing filter circuit, the state amount of the smoothing filter circuit is an electric current flowing to the smoothing reactor.

3. The DCDC converter according to claim 2, wherein the control unit generates a smoothing reactor current command reflecting the damping operation amount and controls to turn on and off the switching circuit based on the smoothing reactor current command.

4. The DCDC converter according to claim 2, wherein the damping operation amount is calculated by raising a fluctuation rate of the voltage of the input capacitor to a second power.

5. The DCDC converter according to claim 3, wherein the damping control unit limits upper and lower limits of the damping operation amount with a limiter and outputs the damping operation amount.

6. The DCDC converter according to claim 1, wherein, when the DCDC converter has, as the smoothing filter circuit, a smoothing reactor, one end of which is connected to the output end of the switching circuit, and a smoothing capacitor connected to the other end of the smoothing reactor, the state amount of the smoothing filter circuit is an electric current of the smoothing reactor or a voltage of the smoothing capacitor.

7. The DCDC converter according to claim 6, wherein the control unit generates a smoothing reactor current command reflecting the damping operation amount and controls to turn on and off the switching circuit based on the smoothing reactor current command.

8. The DCDC converter according to claim 6, wherein the control unit generates a smoothing capacitor voltage command reflecting the damping operation amount, generates a smoothing reactor current command based on the smoothing capacitor voltage command, and controls to turn on and off the switching circuit based on the smoothing reactor current command.

9. The DCDC converter according to claim 6, wherein the damping control unit divides an added-up signal of a signal obtained by removing an unnecessary high-frequency component included in the voltage of the input capacitor from the voltage of the input capacitor and a DC component of the voltage of the input capacitor by the DC component to thereby calculate a fluctuation rate of the voltage of the input capacitor and calculate a damping operation amount corresponding to the fluctuation rate.

10. The DCDC converter according to claim 6, wherein the damping operation amount is calculated by raising a fluctuation rate of the voltage of the input capacitor to a second power.

11. The DCDC converter according to claim 6, wherein
   when a power flow is in a direction from an input side to an output side of the switching circuit, the damping control unit calculates, as the damping operation amount, a signal obtained by raising a fluctuation rate of the voltage of the input capacitor to a second power and,
   when the power flow is in a direction from the output side to the input side of the switching circuit, the damping control unit calculates, as the damping operation amount, a signal obtained by inverting a phase of the signal obtained by raising the fluctuation rate of the voltage of the input capacitor to the second power.

12. The DCDC converter according to claim 7, wherein the damping control unit limits upper and lower limits of the damping operation amount with a limiter and outputs the damping operation amount.

13. The DCDC converter according to claim 6 further comprising an electric current detecting unit that detects a load current flowing to a load connected to the smoothing capacitor, and the smoothing reactor current command is calculated in view of the load current.

14. A DCDC converter that has an input filter circuit including an input reactor connected to a DC power supply and an input capacitor and converts a DC voltage of the input capacitor into an arbitrary DC voltage to output the DC voltage, the DCDC converter comprising:
- a switching circuit with an input end connected to the input filter circuit, the switching circuit including an upper arm side switching element and a lower arm side switching element;
- a smoothing filter circuit connected to an output end of the switching circuit; and
- a control unit that feeds back a state amount of the smoothing filter circuit and controls to turn on and off the switching circuit, wherein
- the control unit includes a damping control unit that calculates, based on a voltage of the input capacitor, a damping operation amount for adjusting the state amount of the smoothing filter circuit by dividing an added-up signal of a signal obtained by removing an unnecessary high-frequency component included in the voltage of the input capacitor from the voltage of the input capacitor and a DC component of the voltage of the input capacitor by the DC component to thereby calculate a fluctuation rate of the voltage of the input capacitor, wherein the damping operation amount corresponds to the fluctuation rate.

15. The DCDC converter according to claim 14, wherein, when the DCDC converter has a smoothing reactor, one end of which is connected to the output end of the switching circuit, as the smoothing filter circuit, the state amount of the smoothing filter circuit is an electric current flowing to the smoothing reactor.

16. The DCDC converter according to claim 15, wherein the control unit generates a smoothing reactor current command reflecting the damping operation amount and controls to turn on and off the switching circuit based on the smoothing reactor current command.

17. A DCDC converter that has an input filter circuit including an input reactor connected to a DC power supply and an input capacitor and converts a DC voltage of the input capacitor into an arbitrary DC voltage to output the DC voltage, the DCDC converter comprising:
- a switching circuit with an input end connected to the input filter circuit, the switching circuit including an upper arm side switching element and a lower arm side switching element;
- a smoothing filter circuit connected to an output end of the switching circuit; and
- a control unit that feeds back a state amount of the smoothing filter circuit and controls to turn on and off the switching circuit, wherein
- the control unit includes a damping control unit that calculates, based on a voltage of the input capacitor, a damping operation amount for adjusting the state amount of the smoothing filter circuit, and wherein
- when a power flow is in a direction from an input side to an output side of the switching circuit, the damping control unit calculates, as the damping operation amount, a signal obtained by raising a fluctuation rate of the voltage of the input capacitor to a second power and,
- when the power flow is in a direction from the output side to the input side of the switching circuit, the damping control unit calculates, as the damping operation amount, a signal obtained by inverting a phase of the signal obtained by raising the fluctuation rate of the voltage of the input capacitor to the second power.

18. The DCDC converter according to claim 17, wherein, when the DCDC converter has a smoothing reactor, one end of which is connected to the output end of the switching circuit, as the smoothing filter circuit, the state amount of the smoothing filter circuit is an electric current flowing to the smoothing reactor.

19. The DCDC converter according to claim 18, wherein the control unit generates a smoothing reactor current command reflecting the damping operation amount and controls to turn on and off the switching circuit based on the smoothing reactor current command.

* * * * *